(12) United States Patent
Pieczynski

(10) Patent No.: US 7,055,257 B2
(45) Date of Patent: *Jun. 6, 2006

(54) LIGHTED FISH MEASUREMENT DEVICE

(75) Inventor: Darren Edward Pieczynski, N9460 Koskela Rd., Wakefield, MI (US) 49968

(73) Assignee: Darren Edward Pieczynski, Wakefield, MI (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/074,475

(22) Filed: Mar. 7, 2005

(65) Prior Publication Data

US 2005/0144800 A1 Jul. 7, 2005

Related U.S. Application Data

(63) Continuation-in-part of application No. 10/334,968, filed on Dec. 30, 2002, now Pat. No. 6,901,674.

(51) Int. Cl.
*G01B 1/00* (2006.01)
(52) U.S. Cl. .............................. 33/511; 33/485; 33/489
(58) Field of Classification Search .................. 33/511, 33/483–485, 489, 549, 492–494, 348; 434/98, 434/404, 103–104, 429–430
See application file for complete search history.

(56) References Cited

U.S. PATENT DOCUMENTS

| | | | | |
|---|---|---|---|---|
| 4,075,467 A | * | 2/1978 | Peterson | 362/602 |
| 4,747,215 A | * | 5/1988 | Waikas | 33/763 |
| 5,097,617 A | * | 3/1992 | Craven | 33/511 |
| 5,148,607 A | * | 9/1992 | Lasiter | 33/549 |
| 5,317,813 A | * | 6/1994 | Reed | 33/809 |
| 5,339,532 A | * | 8/1994 | O'Keefe | 33/511 |
| 5,526,575 A | * | 6/1996 | Hoover et al. | 33/485 |
| 5,637,838 A | * | 6/1997 | Arey et al. | 33/511 |
| 6,115,932 A | * | 9/2000 | Fedora | 33/758 |
| 6,415,521 B1 | * | 7/2002 | Schnell | 33/511 |
| 6,765,155 B1 | * | 7/2004 | Gray | 33/511 |

* cited by examiner

*Primary Examiner*—Yaritza Guadalupe
(74) *Attorney, Agent, or Firm*—Patent Pro

(57) ABSTRACT

A lighted fish measurement device. The apparatus comprises a connection to an outside power source, a backlight source, and circuitry to connect the outside power source to the backlight source. A generally clear rule face including graduations in American Standard and Metric measurements. A semi-transparent colored overlay, variable in length, is mountable over the backlit rule face highlighting user specific graduation lengths. A rugged waterproof enclosure, with a positive stop at the beginning of the rule and a means to secure the lighted fish measurement device to a fishing vessel.

4 Claims, 4 Drawing Sheets

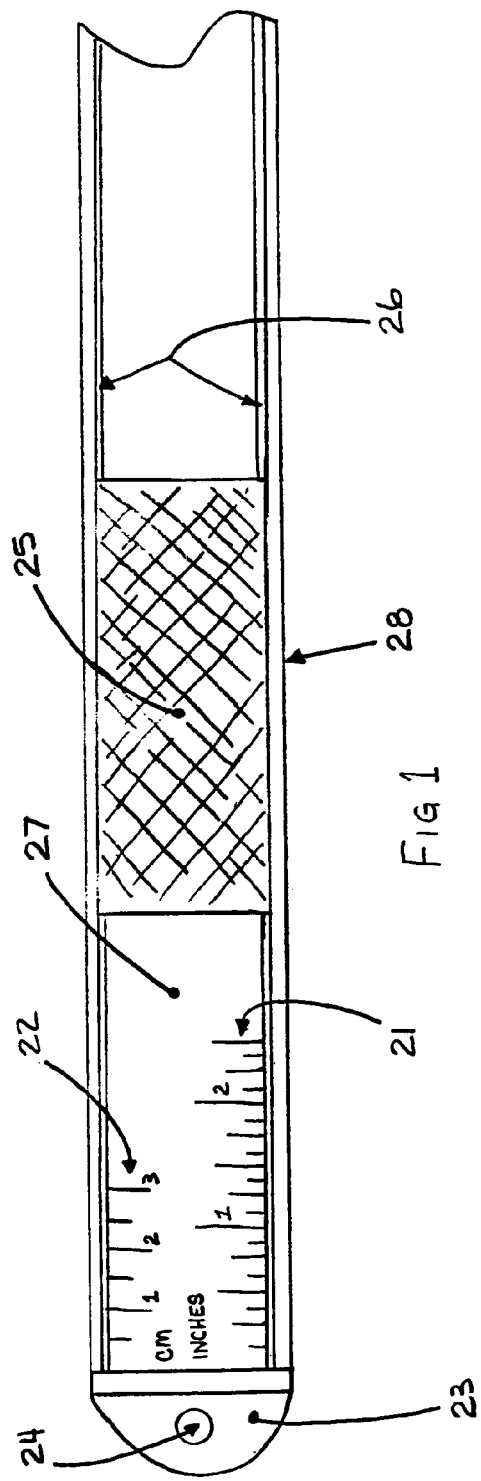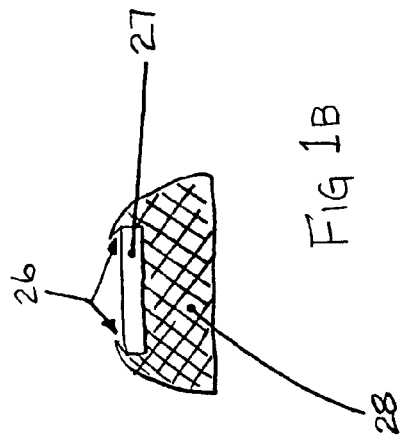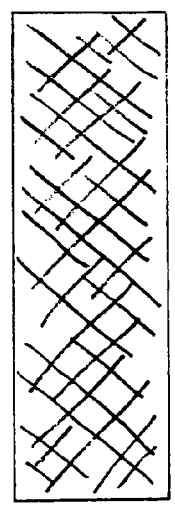

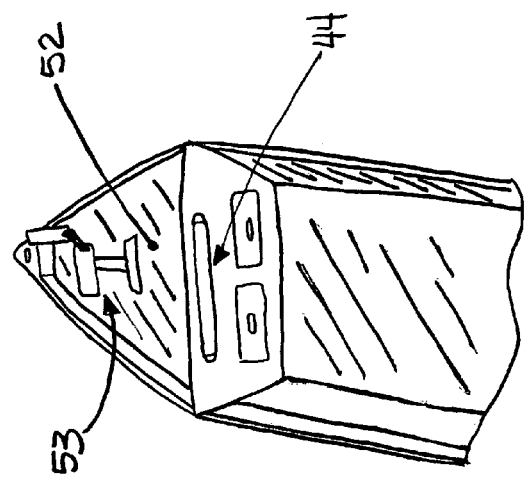
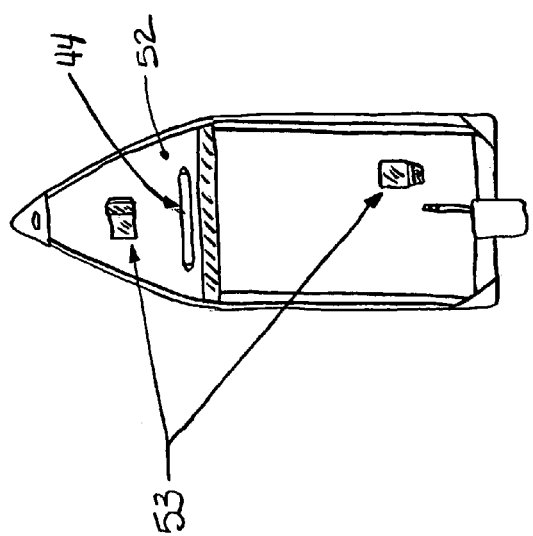
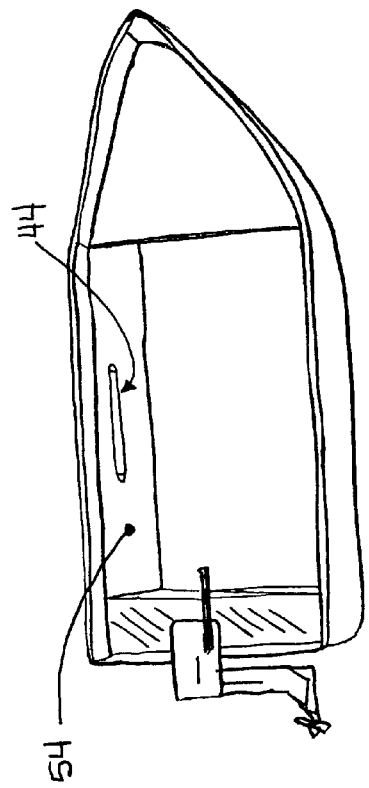

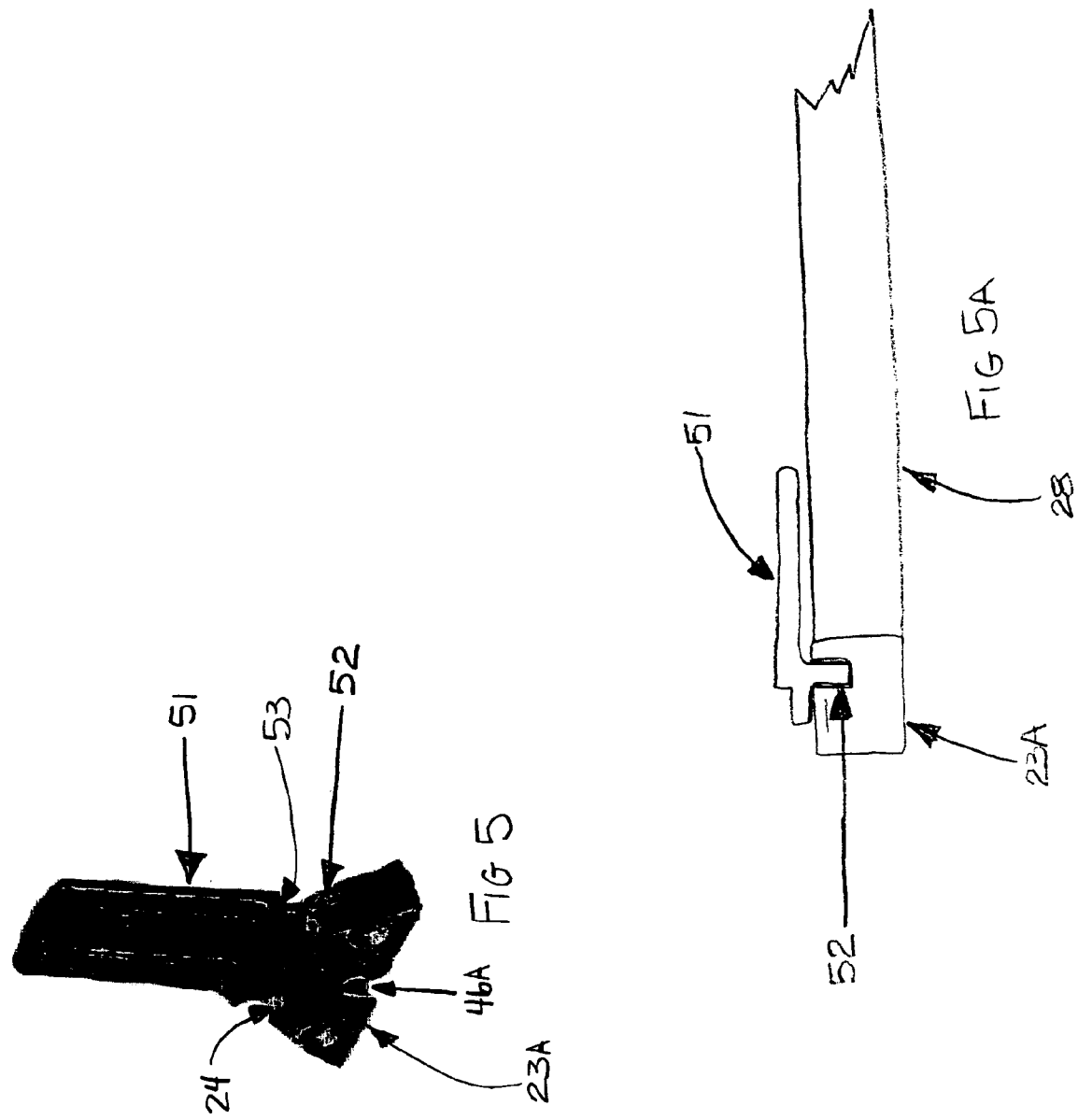

LIGHTED FISH MEASUREMENT DEVICE

This application is a continuation in part of application Ser. No. 10/334,968, filed Dec. 30, 2002, now U.S. Pat. No. 6,901,674.

BACKGROUND OF THE INVENTION

This invention relates generally to the field of fish measurement devices, and more particularly to a lighted fish measurement apparatus to identify slot fish.

Since the time length restrictions have been put into place for anglers, many devices have been designed to measure the length of the fish to aid the angler in determining a legal catch. As years passed, size limitations have changed to also include many variations of rules to any given body of water. Some of these limitations include possession of a determined number of fish may be kept under a certain specified size and a determined number of fish may be kept over a determined size. Another variation of size limitations may state that legal fish fall into a specified range, where anglers may only possess fish between two determined measurements. In either case, whether the span between two measurements is legal for possession or fish that must be returned to the water, these fish are referred to as "slot" fish. In some states, WI for example, these size limitations vary from lake to lake for the same species. An angler must determine whether a fish that is caught falls inside or outside these slot areas both in the daylight and after daylight hours. Prior technology is deficient in aiding an angler in determining the many variations in size limitations during the day or night.

U.S. Pat. No. 3,259,988 issued to C. T. Lunn shows a device to measure the length of a fish, though is not helpful in the determination of slot sized fish. There is mention of measurement in day or night hours by coating with a phosphorescent material to allow the apparatus to glow in the dark. This is a very time limited solution, as after a period of time the device will not be easily seen. U.S. Pat. No. 5,526,575 issued to Hoover et al. discusses the determination of slot size fish though the apparatus falls short in aiding the determination of these fish. The determination after daylight hours is also not addressed. Fedora, U.S. Pat. No. 6,115,932, indicates the legal size limitations of multiple species of fish directly on the rule. Though slot sizes could also be indicated on the rule, the device cannot easily be changed when fishing lake to lake with varying size restrictions. Schnell, U.S. Pat. No. 6,415,521 B1, created a portable backlit fish cleaning measurement device. Though the apparatus addresses the measuring of fish in low light conditions, it does not address variations in slot size indications needed by an angler.

With reference to slot fish, the above fish measurement devices rely on the fisherman to determine whether the measured length of a fish falls into slot regulations. The following information will illustrate a fish measuring device in which enables the user to measure a fish in daylight and low light conditions along with easily identifying slot regulated catches.

To easily measure a fish, the user requires the ability to hold the fish at the starting point of the measurement device or zero measurement point. Craven, U.S. Pat. No. 5,097,617; O'Keefe, U.S. Pat. No. 5,339,532; Hoover et al., U.S. Pat. No. 5,526,575; Lasiter, U.S. Pat. No. 5,148,607; and Schnell, U.S. Pat. No. 6,415,521 have all developed ways to butt the fish at starting point of measurement though have not addressed to ability to measure in low light conditions while determining slot fish.

BRIEF SUMMARY OF THE INVENTION

The primary object of the invention is a fish measurement device.

Another object of the invention is to aid in determining slot fish and be allowed to vary as size restrictions demand.

A further object of the invention is to be lighted for measuring fish in low light conditions.

Another object of the invention is ability to indicate "slot" fish by overlay or electronic display.

Yet another object of the invention is the ability to butt the nose of the fish at the starting point of the rule for measurement.

A further object of the invention is a low profile waterproof enclosure as to not to obstruct personal movement in a boat.

Yet another object of the invention is American Standard and Metric Measurements.

Still yet another object of the invention is the apparatus is mountable in multiple locations in a fishing vessel.

In accordance with a preferred embodiment of the present invention, a lighted fish measurement device comprises a connection means to outside power source; a backlight source; circuitry means to connect said outside power source to said backlight source; a generally clear face including graduations in American Standard and Metric measurements; a semi-transparent colored overlay, variable in length, highlighting user defined graduations; a rugged waterproof enclosure with a connecting means to a positive stop at the beginning of the rule or zero mark, and a means to secure said lighted fish measurement device to a fishing vessel.

Other objects and advantages will become apparent from the following descriptions, taken in connection with the accompanying drawings, wherein, by way of illustration and example, an embodiment of the present invention is disclosed.

BRIEF DESCRIPTION OF SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a perspective view of the preferred embodiment of the invention.

FIG. 1A is a view of the semi-transparent colored overlay depicting lengths can be cut to varied lengths.

FIG. 1B is a cross sectional view of the enclosure and generally clear face.

FIG. 4A is a perspective view of the invention mounted on the front deck of a fishing boat.

FIG. 4B is a perspective view of the invention mounted on the side of the front deck of a fishing boat.

FIG. 4C is a perspective view of the invention mounted on the side of a fishing boat gunnel.

FIG. 5 is a perspective view of the nose stop of the invention in the up position.

FIG. 5A is a perspective view of the nose stop of the invention in the down position.

DETAILED DESCRIPTION OF THE PREFERRED EMBODIMENTS

Figure 2:
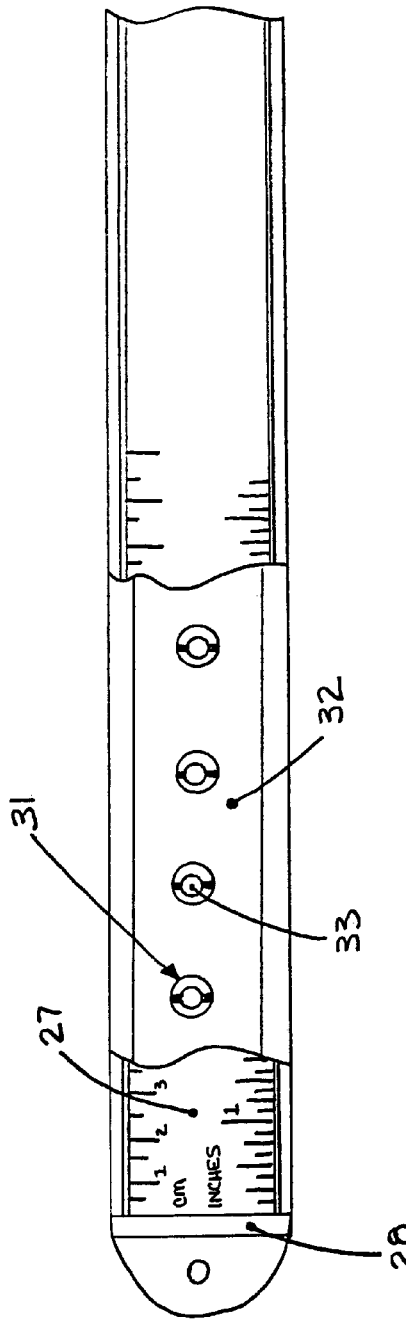
FIG. 2 is a cutaway view of the enclosure and rule exposing view of the printed wiring board with inverted mounted LEDs for backlight.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

With reference to the drawings, a preferred embodiment is shown in FIG. 1. 28 is a rugged waterproof enclosure that houses the apparatus. 23 are flanges that protrude from the base of the enclosure 28 to allow the device to be mounted to a flat surface in a fishing vessel. Flanges 23 include holes 24 to be mounted with a screw. 27 is the generally clear face of the apparatus that includes measurement graduations in American Standard inches 21 and Metric cm 22. For length measurement, the fish is placed over the top of the rule 27 where one end of the fish is held at the beginning of the rule and the length of the fish is then determined by reading the graduation seen at the other end of the fish.

In accordance with the present invention, 25 displays a semi-transparent colored overlay where the FIG. 1A shows it able to be user cut to length. The length of the overlay may be cut to varying sizes to indicate a measurement span defining the slot dimension per a given body of water. 25, after being cut to length can easily be inserted into grooves in the enclosure 26. The 26 grooves do not penetrate the enclosure, but are deep enough to hold the overlay 25 firmly. The user may be able to slide the overlay slightly back and forth on the rule to make minor adjustments. FIG. 1B shows the cross sectional view of the enclosure 28, generally clear face 27 and the grooves 26. The design allows the user to easily remove the semi-transparent colored overlay indicating the slot area on the rule 27 and insert a new measured and trimmed overlay 25 when fishing another body of water where the size regulations have changed. The overlay is washable, reusable, inexpensive so also disposable and easily replaceable. The user may also indicate the specific lake an overlay is to be used by writing on with permanent marker. When a fish is placed on the rule and the length of the catch falls onto the colored area of the overlay, the angler can easily tell whether the fish falls into the slot size and still read the measurement through the overlay. The colors may be green for a keeper or red to indicate a fish that must be returned to the water. With use of the invention, one skilled in the art will appreciate that the time the chain of events to measure and determine slot fish is greatly reduced. A swift measurement can be taken and determination that a fish must be released, results in the fish being out of the water for a shorter period of time, causing less harm to the fish.

An alternate embodiment may use colored or grayscale electronic display or LCD (liquid crystal display) to indicate the measurement graduations and slot areas. The display would be user programmable to indicate the slot area measurements to vary the color or grayscale contrast.

It is another feature of the invention that the measurement device be visible in low light conditions. FIG. 2 displays 27 cutaway to show the printed wiring board 32 with holes 31 spanned throughout the length of the printed wiring board 32 and underneath rule 27. 33 are light emitting diodes of the inverted mounting type. The LED's terminations mount on the backside of the printed wiring board and the LED itself protrudes through the printed wiring board 32 allowing for a low profile enclosure 28. 32 contains the circuitry means and electronic components to illuminate the LEDs 33. The rule 27 is generally clear to allow the LEDs, backlight source, to illuminate 27, but opaque enough to not allow the circuit board and components to not be seen from the outside. Light sources 33, may also be light bulbs and other electronically illuminated components. The inside of the enclosure may also have light reflective properties to increase the amount of light emitted through the rule 27.

Figure 3A:
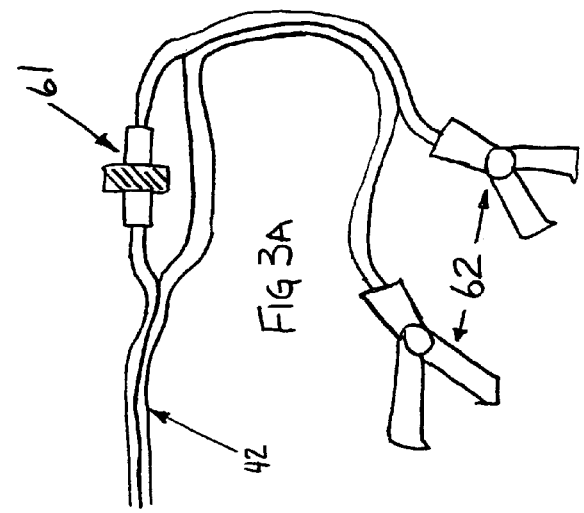
FIG. 3A is a perspective view of conductors, inline fuse and clips for connection to a remote battery.
Figure 3:
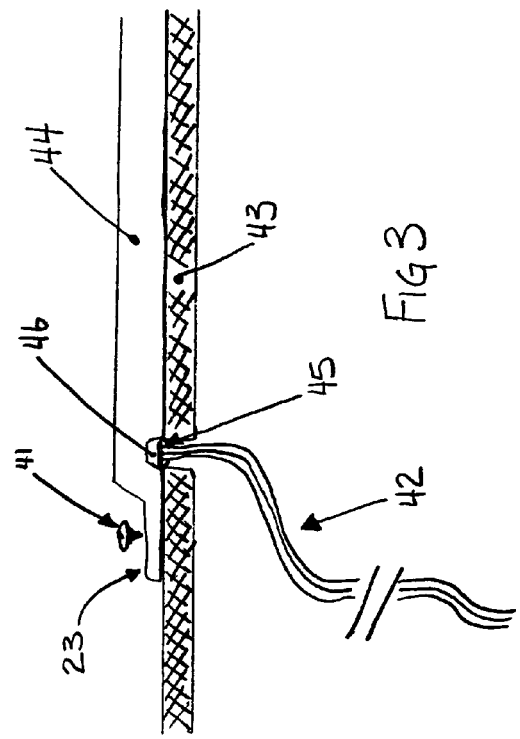
FIG. 3 is a side view of the invention mounted on a cross sectional view of the surface in which mounted.

In keeping with the invention, FIG. 3 displays the present invention 44 mounted to a cross sectional view of a flat surface 43 to which it is to be mounted. 41 shows a screw may be used to secure the apparatus through the flange 23. A double-sided adhesive membrane may also be used between the apparatus 44 and the surface 43 to secure the device when screws are not feasible. 45 is a small hole in the bottom of the apparatus to allow the electrical conductors 42 connect to an outside power source where the conductors run through the surface 43 to which the device is mounted. A rubber grommet or silicone may be used to seal hole 45. 46 is a removable tab where the conductors may be fed out the side of the enclosure when the conductors cannot be fed through the surface. Conductors 42 may run to a fuse block in a fishing vessel where a switch on an instrument panel may control power to the device. FIG. 3A displays the conductors 42 possessing an inline fuse and fuse holder 51 where clips 62 may be connected to a remote battery. The electrical connection process is well known in the art. The apparatus may also contain an enclosed power source to eliminate a need for an outside power source connection.

By way of illustration, FIG. 4A displays the apparatus 44 mounted to a raised front deck 52 of a fishing boat. Seats 53 are shown for reference. In FIG. 4B the invention 44 is mounted to the side of the raised front deck 52 where 53 is a seat on the raised front deck 52. FIG. 4C displays the device 44 mounted to the side gunnels 54 of a fishing boat.

It is another feature of the invention that the apparatus allows for a positive stop at the beginning of the rule or zero point. FIG. 5 illustrates an alternate end cap 23A with a slot 52 to hold the positive stop 51 in the upright position. The positive stop possesses a foot 53 for support when side pressure in applied by holding the fish against the stop. Alternate end cap 23A incorporates mounting holes 24 as with FIG. 1. Alternate end cap 23A also includes alternate access for cable through 46A where allowance is made for conductors 42 as in FIG. 3 to exit out the end of the alternate end cap 23A.

FIG. 5A displays the positive stop 51 in the down position where the stop is removed and flipped where the foot 53 is then inserted into the slot 52 of the alternate end cap 23A. FIG. 5A also displays alternate end cap 23A attached to enclosure 28. In again another alternate embodiment, the positive stop may be hinged for rotation up and down.

The invention is fish measurement device that aids the angler in not only measuring the size of a fish, but also is shown if the fish falls into a slot size regulation. The semi-transparent colored overlay length is user definable and is easily added or removed from the rule. The rule is backlit so it can be easily seen in low light conditions, for the rule and the semi-transparent overlay are illuminated. The enclosure or end cap of the enclosure allows for a positive stop at the beginning of the rule or zero point.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A lighted fish measurement device comprising:
   an elongated rugged waterproof enclosure having a connecting means for a generally clear face and a colored overlay;
   said generally clear face being disposed over a side surface of said enclosure and having graduation indicia in American and Metric units;
   a power source and connection means disposed within or outside said enclosure;
   a backlight source mounted within said enclosure;
   a circuitry means connecting said power source to said backlight source;
   said semi-transparent colored overlay, being variable in length, so as to provide user specific graduation length correspondent to a predetermined measurement or slot size measurement and further having a connecting means to a positive stop at the start of the graduation indicia or zero mark; and
   wherein said generally clear face and said colored overlay are received over said backlight source of said enclosure and wherein said colored overlay is disposed adjacent to said clear face so as to allow quick slot size measurements.

2. A lighted fish measurement device as claimed in claim 1, wherein said backlight is an electronic display.

3. Apparatus as set forth in claim 1, a means to secure said lighted fish measurement device to a fishing vessel where said flanges protrude from ends of said rugged waterproof enclosure posses holes to be surface mounted with a screw.

4. Apparatus as set forth in claim 1, a means to secure said lighted fish measurement device to a fishing vessel with use of a double-sided adhesive membrane.

* * * * *